(12) United States Patent
Hyland

(10) Patent No.: US 11,386,526 B2
(45) Date of Patent: Jul. 12, 2022

(54) SYSTEM AND METHOD OF REDUCING NOISE USING PHASE RETRIEVAL

(71) Applicant: David C. Hyland, College Station, TX (US)

(72) Inventor: David C. Hyland, College Station, TX (US)

(*) Notice: Subject to any disclaimer, the term of this patent is extended or adjusted under 35 U.S.C. 154(b) by 92 days.

(21) Appl. No.: 16/940,847

(22) Filed: Jul. 28, 2020

(65) Prior Publication Data

US 2020/0394761 A1 Dec. 17, 2020

Related U.S. Application Data

(62) Division of application No. 15/738,306, filed as application No. PCT/US2016/039658 on Jun. 27, 2016, now abandoned.

(60) Provisional application No. 62/184,557, filed on Jun. 25, 2015.

(51) Int. Cl.
| | |
|---|---|
| *G06T 5/00* | (2006.01) |
| *G06T 1/00* | (2006.01) |
| *G06T 7/00* | (2017.01) |
| *G06T 5/10* | (2006.01) |
| *G06T 5/50* | (2006.01) |

(52) U.S. Cl.
CPC ............. *G06T 5/002* (2013.01); *G06T 1/00* (2013.01); *G06T 5/10* (2013.01); *G06T 5/50* (2013.01); *G06T 7/97* (2017.01); *G06T 2200/21* (2013.01); *G06T 2207/20048* (2013.01); *G06T 2207/20182* (2013.01)

(58) Field of Classification Search
CPC .. G06T 5/002; G06T 1/00; G06T 5/10; G06T 5/50; G06T 7/97; G06T 2200/21; G06T 2207/20048; G06T 2207/20182
USPC ........................................................ 382/270
See application file for complete search history.

(56) References Cited

U.S. PATENT DOCUMENTS

| | | | | |
|---|---|---|---|---|
| 7,021,795 | B2 * | 4/2006 | Coates ................. | H05B 47/155 362/286 |
| 9,662,067 | B2 * | 5/2017 | Gimenez ............... | G01J 1/0219 |
| 2004/0052426 | A1 * | 3/2004 | Landesman ............ | G01M 11/00 382/255 |
| 2006/0177102 | A1 * | 8/2006 | McGraw ................. | G01W 1/02 382/107 |

(Continued)

FOREIGN PATENT DOCUMENTS

| | | | | |
|---|---|---|---|---|
| EP | 3039390 A1 * | 7/2016 | ............. | A61B 5/742 |
| JP | 6004323 B2 * | 10/2016 | ............. | H01J 37/295 |

*Primary Examiner* — Jerome Grant, II
(74) *Attorney, Agent, or Firm* — The Law Office of Arthur M. Dula; Arthur M. Dula

(57) ABSTRACT

A system and method for producing an image is provided in which magnitude data related to photo data received from multiple apertures configured with photo detectors is manipulated to conform to an assumed image, phase data related to the photo data received from multiple apertures configured with photo detectors is multiplied by the manipulated magnitude resulting in an image function, imaging constraints are applied to the Fourier transform of the image function to create a desired image, and the desired image is tested to determine whether additional iterations of the method are necessary, with the desired image becoming the assumed image in subsequent iterations, until the desired image is no long substantially different from the assumed image.

19 Claims, 13 Drawing Sheets

(56) References Cited

U.S. PATENT DOCUMENTS

| | | | |
|---|---|---|---|
| 2014/0169524 A1* | 6/2014 | Sperl | G01N 23/046 378/62 |
| 2014/0253987 A1* | 9/2014 | Christmas | G03H 1/0808 359/9 |
| 2018/0217064 A1* | 8/2018 | Kim | G01N 21/6456 |

* cited by examiner

SYSTEM AND METHOD OF REDUCING NOISE USING PHASE RETRIEVAL

CROSS REFERENCE TO RELATED APPLICATION

The present application is a Divisional Application of and claims the benefit of U.S. application Ser. No. 15/738,306 filed Dec. 20, 2017, which is claims the benefit of PCT application US2016/039658 filed Jun. 27, 2016 and provisional application No. 62/184,557 filed Jun. 25, 2015 which is incorporated herein by reference.

FIELD OF THE INVENTION

The present invention relates to image production, in particular, constructing high quality images despite large amounts of noise in the coherence magnitude measurement data.

BACKGROUND INFORMATION

The present invention relates to producing images by solving the problem of loss of phase information when solely utilizing photo data, known as phase retrieval. Phase retrieval is the nonlinear estimation problem in which the magnitude of the Fourier transform of the quantity of interest is known or measured and the phase is unknown and must be recovered by exploiting certain constraints on the object of interest. Prior attempts at solving the phase retrieval problem have included error-reduction through the Gerchberg-Saxton algorithm using a four-step iterative process, hybrid input-output where the fourth step of error-reduction is replaced with another function that reduces the probability of stagnation, and the shrinkwrap solution. As applied to astronomy, it is the image of an object in the midst of a dark background that must be determined. In some cases, as in flux collector astronomy, only the magnitude of the optical coherence is measured at various points; and this is the magnitude of the Fourier transform of the image by virtue of the Van Cittert-Zernike theorem.

Presently, in applications to flux collector astronomy using a plethora of large, cheap, "light bucket" apertures implementing Intensity Correlation Imaging (ICI). Based upon the Brown-Twiss effect, ICI involves only intensity fluctuation measurements at each telescope. The time averaged cross-correlation of these measurements produces estimates of the coherence magnitudes from which the image is computed via known phase retrieval algorithms. In contrast to amplitude interferometry, no combiner units are required, and the sensitivity to phase and intensity scintillations due to atmospheric conditions is negligible. Thus, ICI has the potential to enormously reduce hardware costs and complexity. However, the multiplier between the intensity fluctuation cross-correlation and the coherence magnitude is very small, so adequate signal-to-noise ratio in the coherence magnitude estimates requires long integration times. The crux of the problem seems to be that, heretofore, the measurement of coherence magnitude values and determination of the image via phase retrieval are conceived to be two separate steps.

SUMMARY OF THE INVENTION

In general, in one aspect, the invention relates to a system and method of image construction from light collecting apertures. The method comprises receiving, by a plurality of light collecting apertures, photo data from a plurality of photo sensors, evaluating the photo data to determine the absolute magnitude of optical coherence, sending the photo data to an image assessment module, reducing the noise of the photo data by manipulating the absolute magnitude of the optical coherence to conform to an assumed initial image having an initial image magnitude and initial image phase resulting in an estimated magnitude, taking the Fourier transform of multiplying the estimated magnitude by the initial image phase to determine an estimated image, applying constraints to the estimated image to determine a desired image, testing the desired image for convergence and whether it is different from the assumed initial image, if the desired image fails the tests it becomes the assumed initial image, and the process reiterates.

The present invention is a method that, from very noisy coherence magnitude data, simultaneously estimates the true coherence magnitudes and constructs the image in a novel way by doing so in one step. It is shown that because of the numerous constraints on both the image and the coherence magnitudes, a substantial portion of the measurement noise can be suppressed.

BRIEF DESCRIPTION OF THE DRAWINGS

These and other features and advantages of the present invention will be better understood by reading the following Detailed Description, taken together with the Drawings wherein.

DETAILED DESCRIPTION OF THE PREFERRED EMBODIMENTS

Figure 1:
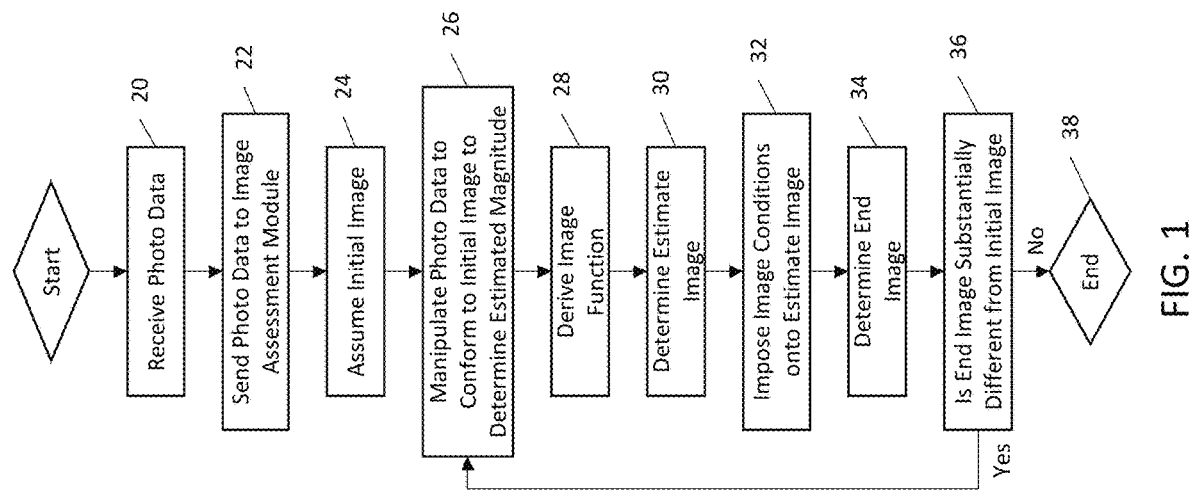
FIG. 1 shows a flow chart showing the method and system of the present invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details to avoid unnecessary complicating the description.

In general, embodiments of the invention provide a system and method for constructing a high-quality image. Photo data is received from light-collecting apertures distributed on a surface and sent to a central collection point where it can be evaluated. The photo data includes magnitude measurements of an optical coherence. An image assessment module receives this photo data and constructs a high-quality image based on the data.

The embodiment of FIG. 1 provides a flow chart illustrating the present invention. Referring to FIG. 1, in box 20, a plurality of light collecting apertures measures photo data, including the magnitude of an optical coherence at many relative locations. Each light collecting aperture comprises a sensor to receive photons and record output subtracting the average light intensity resulting in the absolute magnitude of the optical coherence. In an embodiment of the invention the photo data is sent to all other light collecting apertures and at least one aperture is further configured to evaluate the absolute magnitude of the optical coherence from the photo data. It is assumed that an image produced from this photo data would have substantial amounts of noise such that $SNR_{\hat{G}^2} = 10^{-8}$ ($\sigma \cong 10^4/\sqrt{2}$).

The system then proceeds to box 22 where, this absolute magnitude data is sent to a central collection point having an image assessment module. The image assessment module is configured to reduce the noise of an image by applying an iterative phase retrieval algorithm as described herein and in boxes 24-34. The input of the phase retrieval algorithm includes the absolute magnitude of the optical coherence where the number of coherence measurements equals the number of pixels in a desired optical image.

In an embodiment of the invention, the phase retrieval algorithm takes an initial image. During the first iteration, the initial image is an assumed image pixilated into a grid, N pixels on each side. It is further assumed that at the outset, the foreground of the initial image can be bounded by a simple boundary. As is typical, there may additionally be many "background" or zero intensity pixels within the rectangle as well. In the present embodiment of the invention, the initial image is a square with the same number of pixels on each side however, one having knowledge in the art understands that the initial image may comprise any geometric shape. Likewise, the optical coherence magnitudes comprise a nonnegative matrix of the same dimensions. It is convenient to consider both image and coherence as $N^2$-dimensional vectors.

The algorithm is mathematically described below with the steps A-F below corresponding to boxes 24-34 in FIG. 1.

$$G' = \mathfrak{I} g \quad \text{A}$$

$$\hat{G} \leftarrow (1-\varepsilon)\hat{G} + \varepsilon |G'|, \varepsilon \cong 0.002 \quad \text{B}$$

$$G_p = \hat{G} \cdot G' \cdot (1/|G'|) \quad \text{C}$$

$$g_p = \mathfrak{I}^H G_p \quad \text{D}$$

$$g_{pp} = \tau g_p + [I-\tau]\max\{0, \text{Re}(g_p)\} \quad \text{E}$$

$$g = (I-\tau)g_{pp} + \tau(g - \beta g_{pp}), \beta \cong 0.7 \quad \text{F}$$

The notation is defined by:
$g \in C^{N^2}$ = Current value of the estimated image (pixelated)
$\bar{g} \in R^{N^2}$ = The true image
$\mathfrak{I} \in C^{N^2 \times N^2}$ = Discrete Fourier transform (unitary matrix, $\mathfrak{I}^{-1} = \mathfrak{I}^H$)
$\bar{G} = \mathfrak{I} \bar{g}$ = The true coherence
$\tau \in R^{N^2 \times N^2}$ = Projection onto the image pixels constrained to have zero intensity (all elements zero or unity)

$\hat{G} \in R^{N^2}$ = Measured coherence magnitude

Where the optical coherence magnitude data is represented by:

$$\hat{G} = |\bar{G} + \tilde{G}|$$

$$\tilde{G}_k = \bar{G}_k \sigma(N_{1,k} + iN_{2,k}), k=1, \ldots, N^2$$

Where $\sigma$ is a positive, real number and $N_{1,k}$ and $N_{2,k}$ are all mutually independent Gaussian random variables of zero mean and unit variance. The algorithm here recognizes that much of the noise in the averaging data is inconsistent with the image domain constraints, and can be rendered harmless if both the Fourier domain and Image domain constraints can be made to intersect. Here, the usual image domain constraints (the background pixels are zero) are augmented by the requirement that the foreground pixels be real-valued and positive. The algorithm accepts the noisy coherence magnitude data and uses a relaxation technique to project this data onto a subspace wherein the image domain constraints can be satisfied. Run to completion for a single set of coherence magnitude data, we have shown by example, that the impact of much of the noise is eliminated, even for extremely large amounts of noise. By running the algorithm for multiple, independent data sets, and averaging the results one can achieve further substantial improvement in image quality.

In box 24, an initial image is assumed where each pixel represents a random number between 0 and 0.1. In an embodiment of the invention, during the first iteration, all pixels will be zero. In an alternate embodiment of the invention, it does not matter what number each pixel represents. The system then proceeds to box 26 where the measurement of the magnitude of the optical coherence is modified from the photo data but calculated closer to the initial image data resulting in an estimate of the magnitude of the coherence. From the outset, the magnitude of $\hat{G}$ obtained in step B and in box 26 is very large owing to the noise component, and likewise the magnitudes of $g_p$ and $g$ are similarly large. However the average intensity of the image is immaterial to image interpretation, so we often normalize each image result by its infinity norm, that is: $g \rightarrow g/\|g\|_\infty$, where $$\|g\|_\infty = \max_k |g_k|.$$

At box 28, the estimate of the magnitude of the coherence calculated at box 26 is multiplied by the phase of the initial image.

The system continues to box 30, where the Fourier transform of the result of box 28 is taken to determine an estimated image and at box 32 image conditions are imposed on the estimated image and at box 34, the image is assessed to determine whether it converges or not. In an embodiment of the invention, the image conditions include removal of imaginary numbers forcing any complex numbers to be real numbers. In an embodiment of the invention the image conditions include requiring all negative values to be positive. In an embodiment of the image the value of $\tau$ is set to 0 if the pixel is in the foreground and 1 if it is in the background. In an embodiment of the invention, each pixel in the initial image when the image domain constraint violation, $\|\tau g\|_2^2$, is a minimum, and test to see if it is less that $0.01\|g\|_\infty$. If so, the value of $\tau$ for that pixel is set to unity.

Steps D, E, and F and corresponding boxes 30-34 imply that when the algorithm converges, the following constraints are satisfied:

$$\tau \Im^H \tilde{G} = 0$$

$$[I-\tau]\text{Im}(\Im^H \tilde{G}) = 0$$

$$[I-\tau]\{|\text{Re}(\Im^H(\overline{G}+\tilde{G}))|-\text{Re}(\Im^H(\overline{G}+\tilde{G}))\} = 0$$

The rank of $\tau$ is the number of pixels in the background, M. Hence the first equation amounts to 2M constraints on the noise component, $\tilde{G}$. The second condition supplies $N^2-M$ constraints. Since $\overline{G} \ll |\tilde{G}|$, and the phases of elements of $\tilde{G}$ are uniformly distributed, one half of the $N^2-M$ constraints are operative in the early iterations of the algorithm, and these constrain $\tilde{G}$. Thus, initially, the algorithm drives to impose $\frac{3}{4}N^2+\frac{1}{2}M$ constraints on $\tilde{G}$, while $2N^2$ independent conditions would be needed to determine $\tilde{G}$ uniquely. Thus, it is not surprising that steps D, E, and F; and especially E, strongly drive the algorithm to increase the effective SNR of the computed image.

By relaxing the imposition of zero intensity conditions on the background portion of the image, this method greatly reduces the incidence of stagnation. However, if there is excessive noise in the coherence magnitude data the algorithm can still fail to converge. If the Fourier domain constraints consist of noisy coherence magnitude values, it is generally impossible to satisfy both image domain and Fourier domain constraints, leading to oscillation and stalled convergence. This issue can be addressed by proposing a formulae of the type step B above, which relaxes the Fourier domain constraint in a manner which harmonizes the two classes of constraint, achieving intersection between them. A significant difference from prior approaches is that the relaxation parameter is chosen to be a positive constant much less than unity. Another point of difference is step E which demands that intensity values within the image foreground be real and positive. The present approach can suppress substantial amounts of noise in the computed when used on multiple sets of coherence magnitude data. Specifically, very large magnitudes of noise (very small data SNR) can be successfully handled.

In an embodiment of the invention, the phase retrieval algorithm is applied to each measurement for at least one iteration and the Fourier transform is applied to construct the desired optical image as shown in box 34. The system proceeds to box 36, where the desired optical image is evaluated to determine how much it has changed. Multiple iterations may be applied by returning to box 26 until the change in the image falls into a tolerance level and essentially ceases to change as determined in box 38.

The following example illustrates various aspects of the invention and is not intended to limit the scope of the invention.

Example

Figure 2:
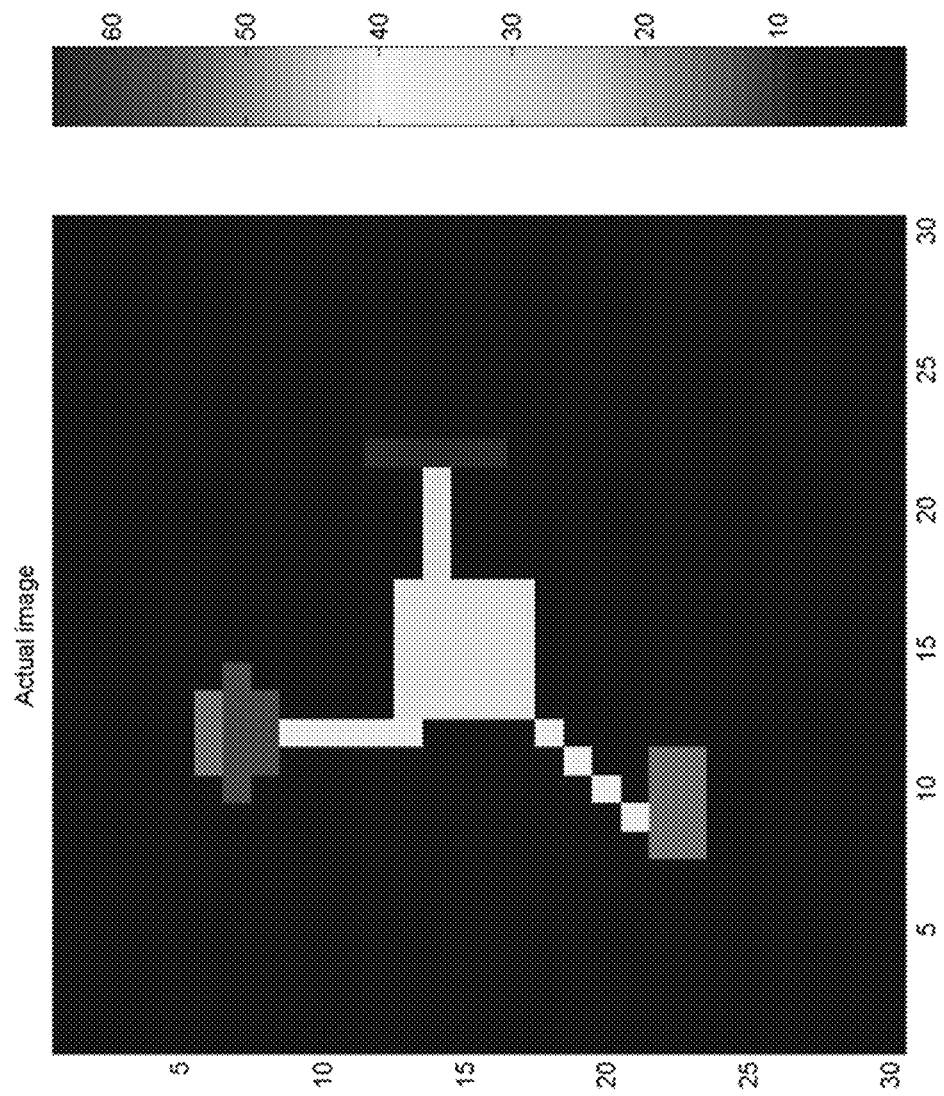
FIG. 2 shows an example image, with bounding rectangle.

To illustrate results, we use a fictitious satellite image introduced and shown in FIG. 2.

Our example also involves a huge amount of noise, e.g. $SNR_{\tilde{G}^2} = 10^{-8}$ ($\sigma \cong 10^4/\sqrt{2}$)

It is assumed that at the outset, that the foreground of the image can be bounded by a simple boundary (a rectangle in this case), as illustrated by the dashed line in FIG. 2. As is typical, the example has many "background" (zero intensity) pixels within the rectangle as well. The above algorithm can be complemented by one of several existing methods of incorporating all the background pixels within the projection $\tau$; i.e., filling in the empty spaces in the rectangle in FIG. 1. To illustrate how this can be done in the initial stages of the algorithm, we examine each pixel in the initial rectangle when the image domain constraint violation, $\|\tau g\|_2^2$, is a minimum, and test to see if it is less that $0.01\|g\|_\infty$. If so, the value of $\tau$ for that pixel is set to unity.

Figure 3:
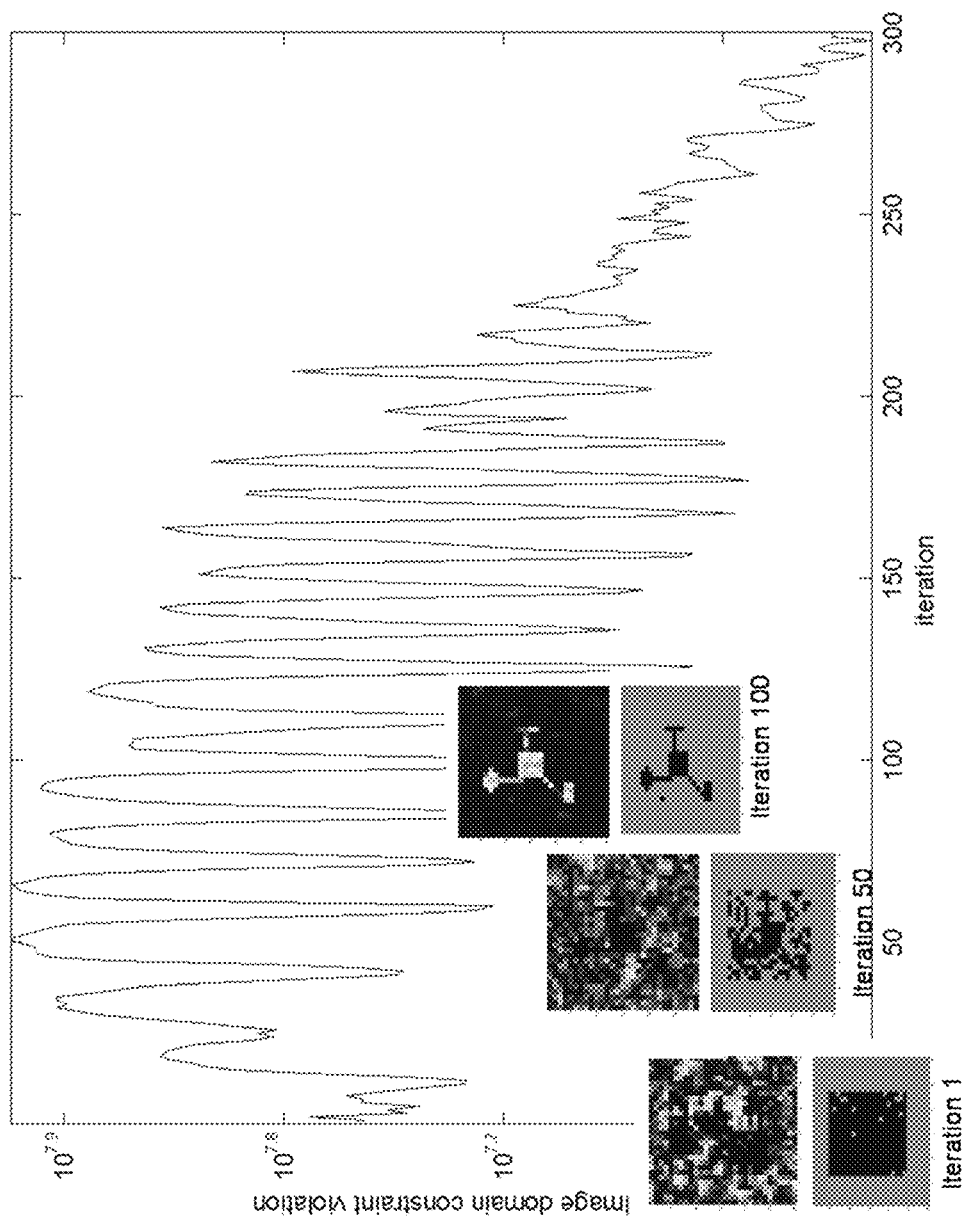
FIG. 3 shows the Frobenius norm of the total background pixel constraint violations for the first iterations.
Figure 4:
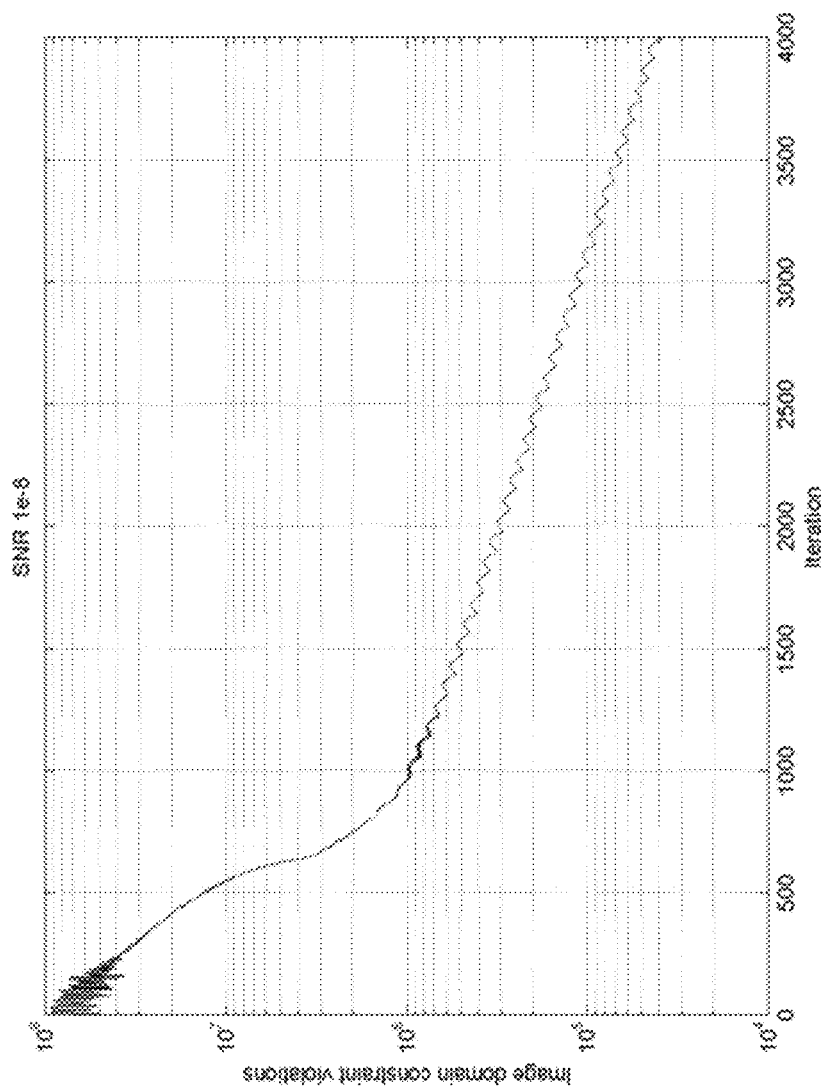
FIG. 4 shows a long-term history of the total background constraint violations.

FIG. 3 shows the constraint violation as a function of iteration, along with the image and $\tau$ values corresponding to various stages of development. It is evident that $\tau$ rapidly evolves into a tight boundary demarcating the background pixels. The complete projection can be found in this way during the processing of the first set of coherence magnitude data, then in the processing of subsequent data sets, the projection can be held constant. FIG. 4 shows the evolution of the constraint violation over a longer period. After the first, brief oscillation, associated with refining $\tau$, the constraint violation steadily decreases by over three orders of magnitude in 4000 iterations. In the following, we assume the refined value of $\tau$ and focus on the noise reduction characteristics of the algorithm.

From the outset, the magnitude of $\hat{G}$ obtained in step B is very large owing to the noise component, and likewise the magnitudes of $g_p$ and $g$ are similarly large. However the average intensity of the image is immaterial to image interpretation, so we often normalize each image result by its infinity norm, that is: $g \rightarrow g/\|g\|_\infty$, where $$\|g\|_\infty = \max_k |g_k|.$$

The rank of $\tau$ is the number of pixels in the background, M. Hence the first equation amounts to 2M constraints on the noise component, $\tilde{G}$. The second condition supplies $N^2-M$ constraints. Since $\overline{G} \ll |\tilde{G}|$, and the phases of elements of $\tilde{G}$ are uniformly distributed, one half of the $N^2-M$ constraints are operative in the early iterations of the algorithm, and these constrain $\tilde{G}$. Thus, initially, the algorithm drives to impose $\frac{3}{4}N^2+\frac{1}{2}M$ constraints on $\tilde{G}$, while $2N^2$ independent conditions would be needed to determine $\tilde{G}$ uniquely. Thus, it is not surprising that steps D, E, and F; and especially E, strongly drive the algorithm to increase the effective SNR of the computed image. One may illustrate this by following the trajectory of a typical pixel value in the complex plane as a function of the iteration number.

For our example, we choose to follow the evolution of matrix element $(g_p)_{k,j}$; k=j=15 which is arrived at in step D. $g_p$ is computed before the positivity of its real part is imposed in step E, and thus displays the full extent to which the current image estimate fails to satisfy the above constraints. Pixel (15,15) is located on the main body of the spacecraft in FIG. 2.

Figure 5:
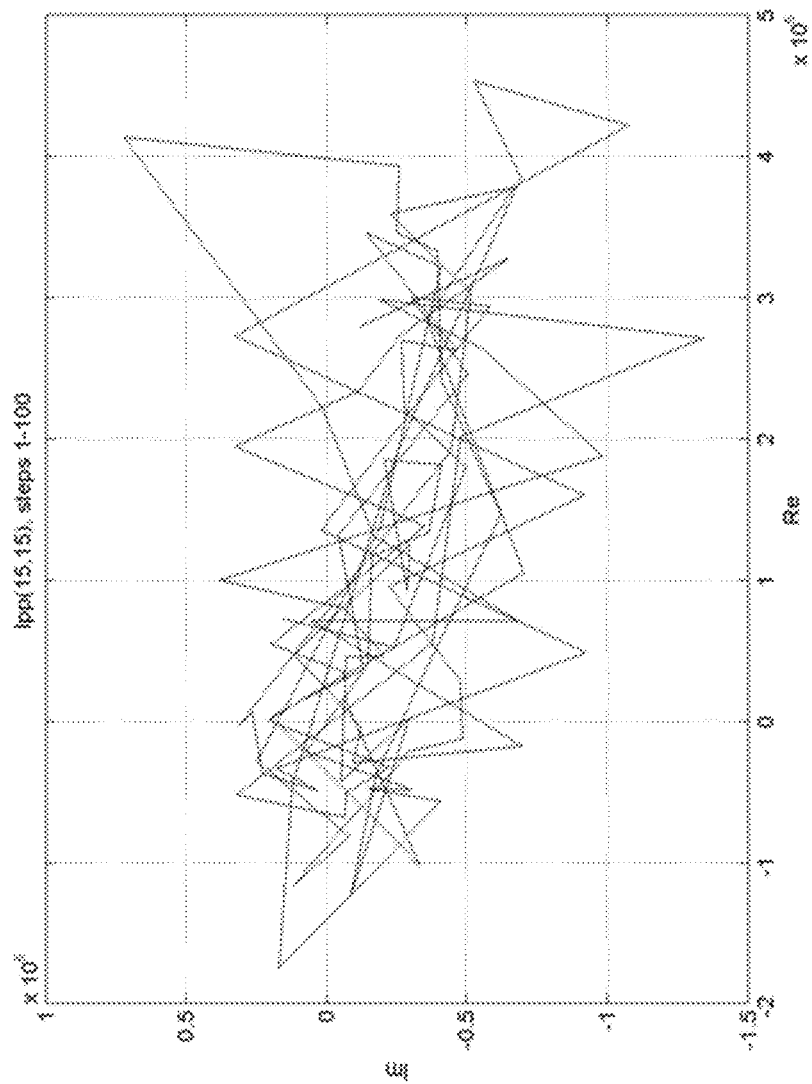
FIG. 5 shows the initial variation of pixel (15,15) in the complex plane.
Figure 6:
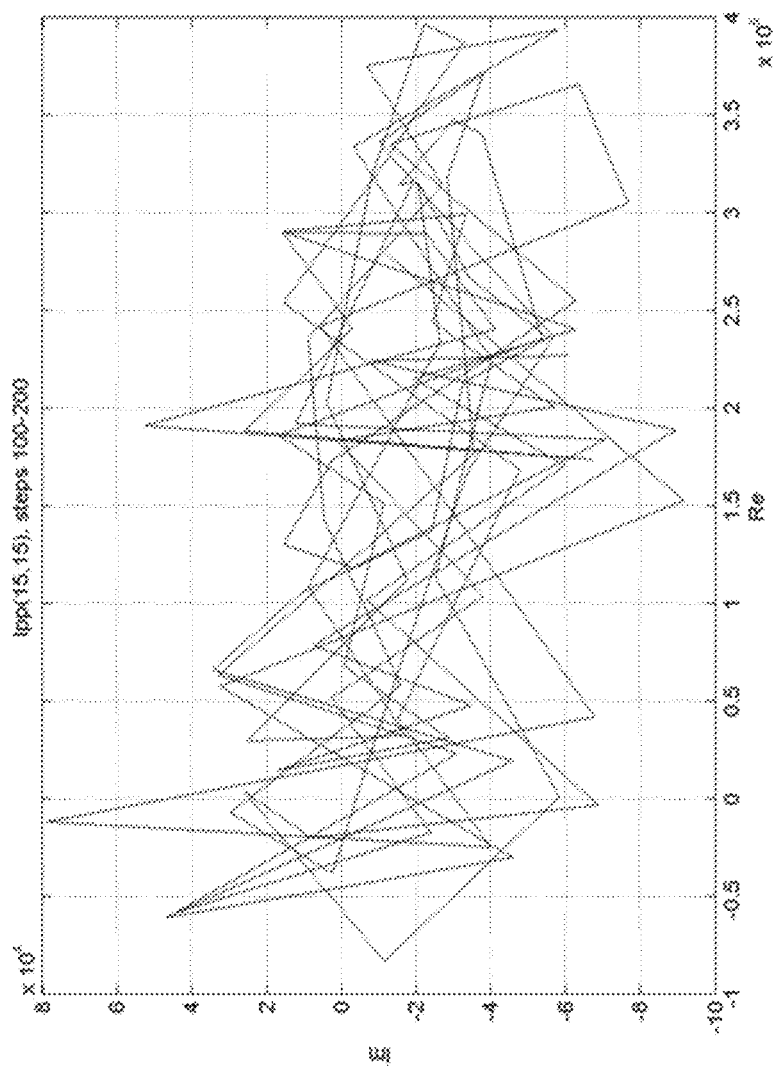
FIG. 6 shows the shift of pixel (15,15) toward the right half plane.

During the first hundred iterations (FIG. 5) $(g_p)_{15,15}$ makes very large excursions, starting with a substantial region in the left half plane. However, one immediately sees the influence of Step E, because there is a constant drift to the right as shown in FIG. 6, for iterations 100 to 200. Further the extent of variation in the real and imaginary parts remains relatively constant. The trend continues until (iterations 200-300, FIG. 7) the real part of $(g_p)_{15,15}$ remains entirely positive. At this point, the positivity constraint listed above becomes inoperative, and step E has no effect. Moreover, in the evolution in FIG. 7, the range of variation contains the value of the real part of $(g_p)_{15,15}$ that the algorithm will ultimately converge to. Hence at this stage, which occurs early in the convergence process, the variability of $(g_p)_{15,15}$ is comparable to the "signal" that will be converged to. One can say that the signal-to-noise ratio is approximately one or greater. This is attained even though the supplied coherence magnitude data has an SNR of one in one hundred million. Note that the algorithm (principally steps B and E) increases the SNR not by reducing the noise component of the image, but by increasing the signal component. These statements hold for all of the foreground pixels. Thus the algorithm quickly reaches a stage where the overall SNR is of order unity—a regime in which the constraints have been shown to effect further reduction of noise.

Figure 7:
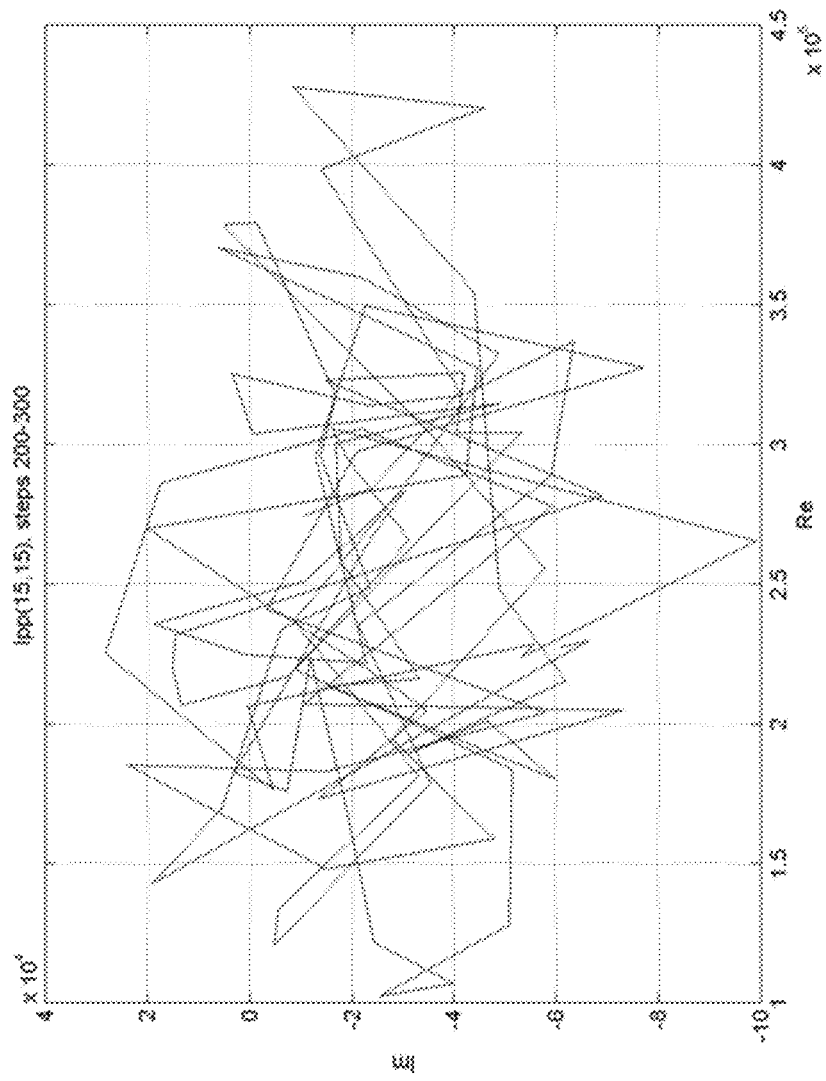
FIG. 7 shows the evolution of pixel (15,15) when it remains entirely in the right half plane.
Figure 8:
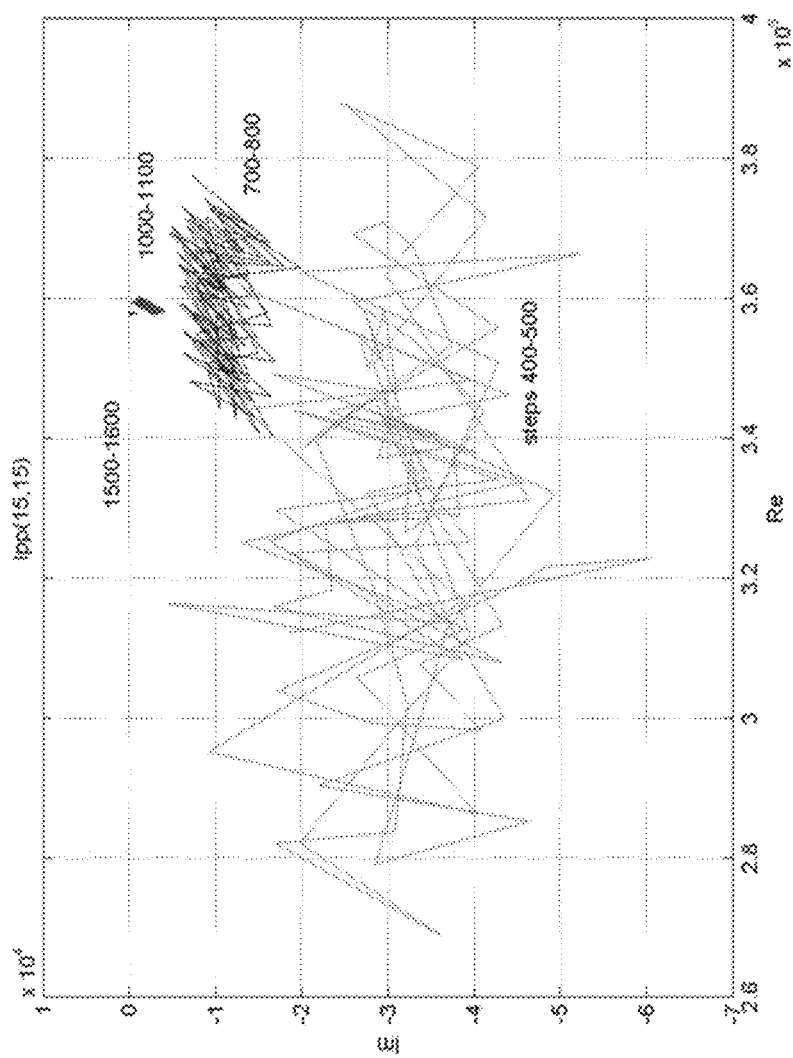
FIG. 8 shows the reduction of the imaginary part of pixel (15,15) and its final convergence.

Beyond the situation shown in FIG. 7, the only image domain constraints that remain operative are the zeroing out of the background pixels and the imaginary parts of the image in the foreground. FIG. 8 shows the resulting development. The range of variation along the real axis remains centered at the eventually determined value, and continually decreases, while the imaginary part of $(g_p)_{15,15}$ converges to zero. At roughly 1500 iterations, $(g_p)_{15,15}$ converges to a real-valued and positive value.

Thusly, at the very start of the algorithm the foreground image values are widely disbursed, with numerous pixels in the left-half plane. Steps B and D, however, work to shift all pixels to the right, until all their real parts are positive. After this stage, the real parts of g do not change appreciably, rather it is the imaginary parts of g that are diminished. The pixel values move upward until they come to rest on the real axis. Note that steps B and D work to increase the estimated "true" coherence magnitudes, and correspondingly the estimated image until the variability of the real parts of the image values increases beyond the noise levels of the measured coherence data. In effect, the numerous constraints on the problem allow us to estimate and suppress much of the noise until the effective SNR of the image estimate is greater than one.

Figure 9:
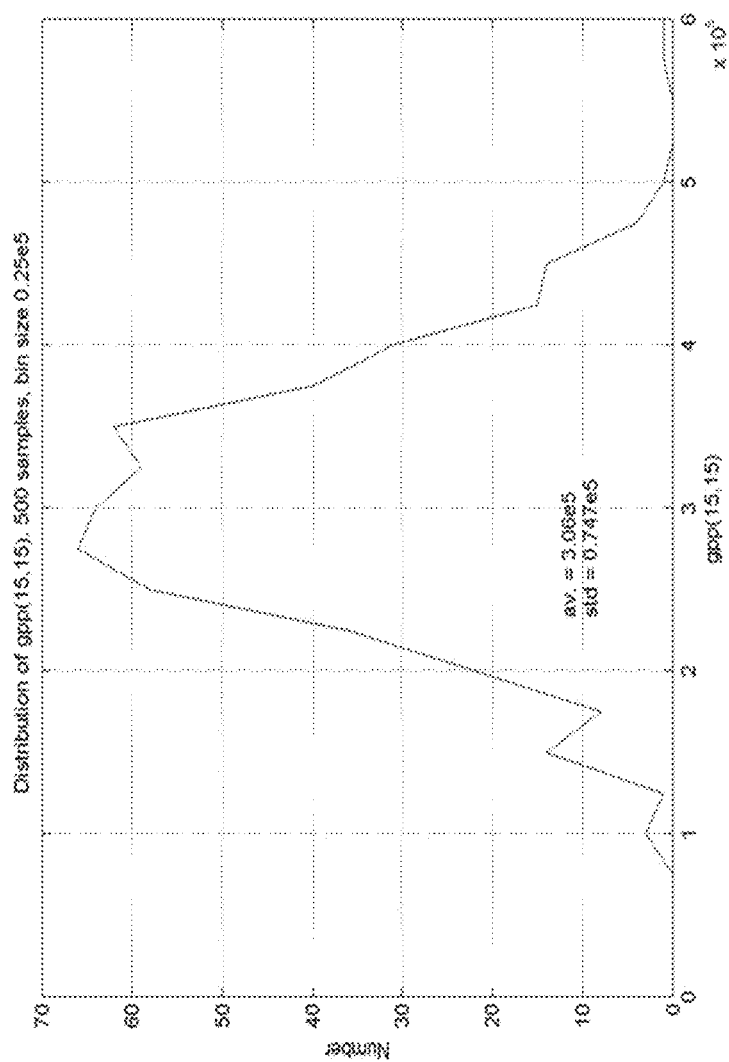
FIG. 9 shows a histogram illustrating the probability density of the value of pixel (15,15).
Figure 10A:
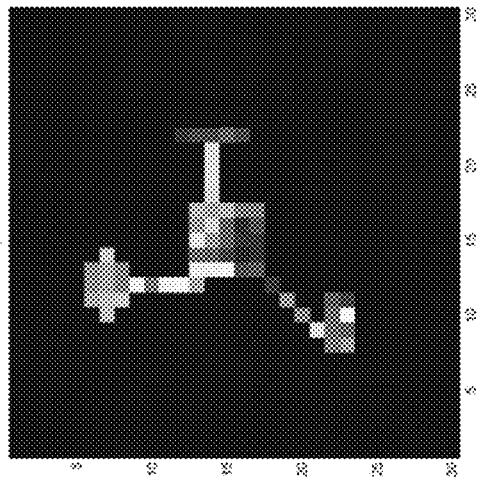
FIGS. 10A-D show convergence of images averaged over multiple coherence magnitude measurement sets: (A) $1^{st}$ data set, (B) 10 sets, (C) 40 sets, (D) 100 sets.
Figure 10B:
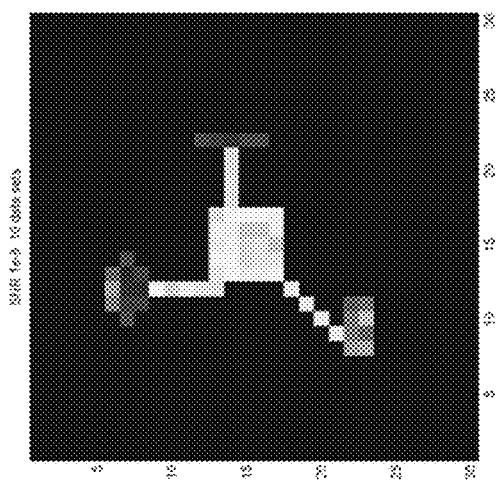
Figure 10C:
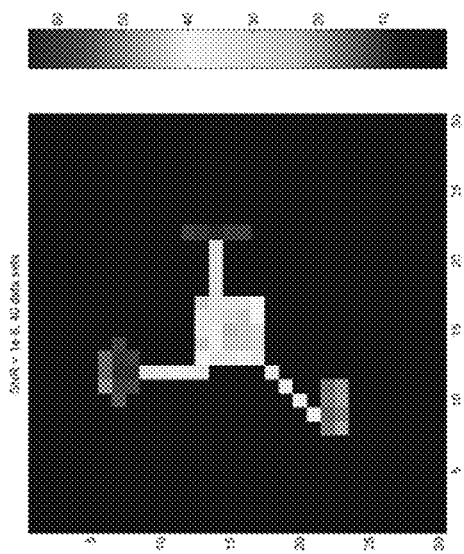
Figure 10D:
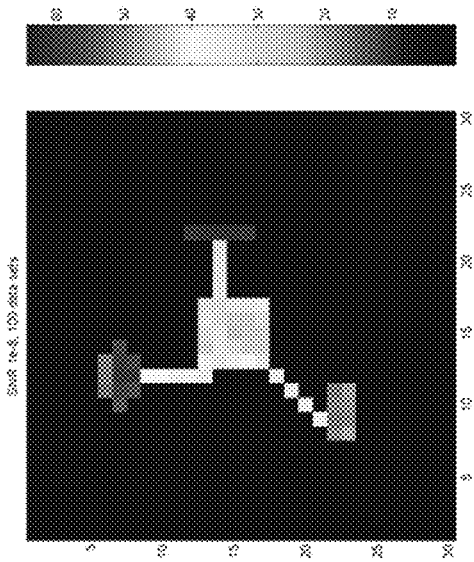

Now we examine the statistics of the performance of the algorithm when it is used to process several independent magnitude measurements, each a realization of the statistical ensemble given by (2.b). To illustrate results, we again consider the value of $(g_p)_{15,15}$ as in the previous discussion. In this case we are concerned with the values obtained with each independent set of measurements once the algorithm is run to a high degree of convergence. Clearly, since there is random variation of the noise components of the different sets of coherence magnitude measurements, there should also be statistical variation in the converged values of $(g_p)_{15,15}$. To explore this, 500 different realizations of the noisy coherence magnitude measurements were created, and for each, the algorithm was run to convergence (to a high degree of approximation, using 2000 iterations in each case). The histogram of the resulting real, positive values of $(g_p)_{15,15}$ is shown in FIG. 9. The results suggest that the probability density of $(g_p)_{15,15}$ is unimodal (indeed, approximately Gaussian) with an average value of $3.06 \times 10^5$ and a standard deviation of $0.75 \times 10^5$. This is an SNR of approximately four—despite the extremely noisy data, e.g. $SNR_{\tilde{G}^2} = 10^{-8}$.

Similar results are observed for all foreground pixels. This indicates that the converged algorithm creates a projection, call it P that removes from $\overline{G} + \tilde{G}$ that portion which is inconsistent with the satisfaction of the image domain constraints. Since $\overline{G}$ is the coherence magnitude of the actual image, $P[\overline{G}]$ is equal to some real, positive multiple, call it $\mu$, of $\overline{G}$: $P[\overline{G}] = \mu \overline{G}$.

Any two coherence magnitude data sets of the same object have a common $\overline{G}$ but different noise components, say $\tilde{G}^{(k)}$ and $\tilde{G}^{(j)}$. It is observed that $\tilde{G}^{(k)}$ and $\tilde{G}^{(j)}$, when operated on by P, are uncorrelated. Moreover, the standard deviation of each $\|\tilde{G}^{(k)}\|$ is of order $\mu\|\overline{G}\|$. Since the Fourier operator is unitary, the same properties hold for the computed image, $\overline{g} + \tilde{g}^{(k)}$, where $\overline{g}$ is the actual image and $\tilde{g}^{(k)}$ is the kth realization of its noisy component. Letting $$P_g = P[\mathcal{F}[\ldots]], \text{ we have: } \begin{array}{l} P_g[\overline{g}] = v\overline{g} \\ E[P_g[g^{(k)}]P_g[\tilde{g}^{(j)}]] \cong v^2|\overline{g}|^2 \delta_{kj} \end{array}$$

where $v$ is a real, positive constant. These relations confirm that a refined image estimate can be found by averaging the results of the algorithm for each of several independent coherence magnitude data sets. Suppose there are L such sets, then:

$$g_L = \frac{1}{L}\sum_{m=1}^{L} g_m = \overline{g} + R$$

$$\text{s.d. } [R] \sim |\overline{g}|/\sqrt{L}$$

The improved convergence to the true image is illustrated for our example case for increasing values of L in FIGS. 10A-D where we display $g_L/\|g_L\|_\infty$.

Comparing with FIG. 2, even with only ten measurements (FIG. 10B) we see that there is considerable clarity to the image. The relatively small contrasts between different components of the image are mostly evident. Later images (FIGS. 10B,C) show increasing fidelity, and using the color bar, one notes errors in the 10% to 1% range. More quantitatively, consider the standard deviation of the image error within the foreground pixels, defined by:

$$E_g = \|[I - \tau](\hat{g}_L - \hat{\overline{g}})\|_2 / \text{rank}[I - \tau]$$

$$\hat{g}_L = g_L / \|g_L\|_\infty$$

$$\hat{\overline{g}} = \overline{g} / \|\overline{g}\|_\infty$$

Figure 11:
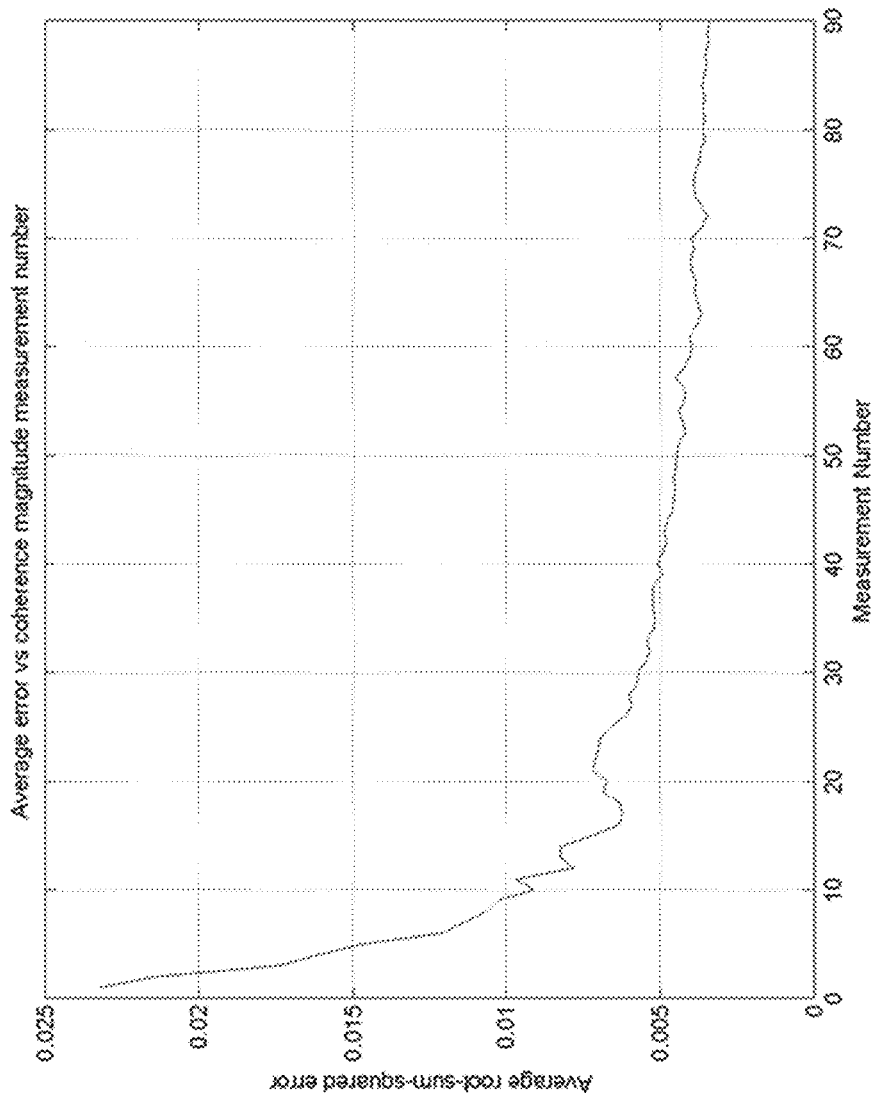
FIG. 11 shows an averaged root-sum square image error vs. L, the measurement number.

Note that each element of both $\hat{g}_L$ and $\hat{\overline{g}}$ are contained in (0,1]. FIG. 11 shows $E_g$ as a function of the number of data sets used in the average. As anticipated, the function is approximately proportional to $1/\sqrt{L}$.

Figure 12:
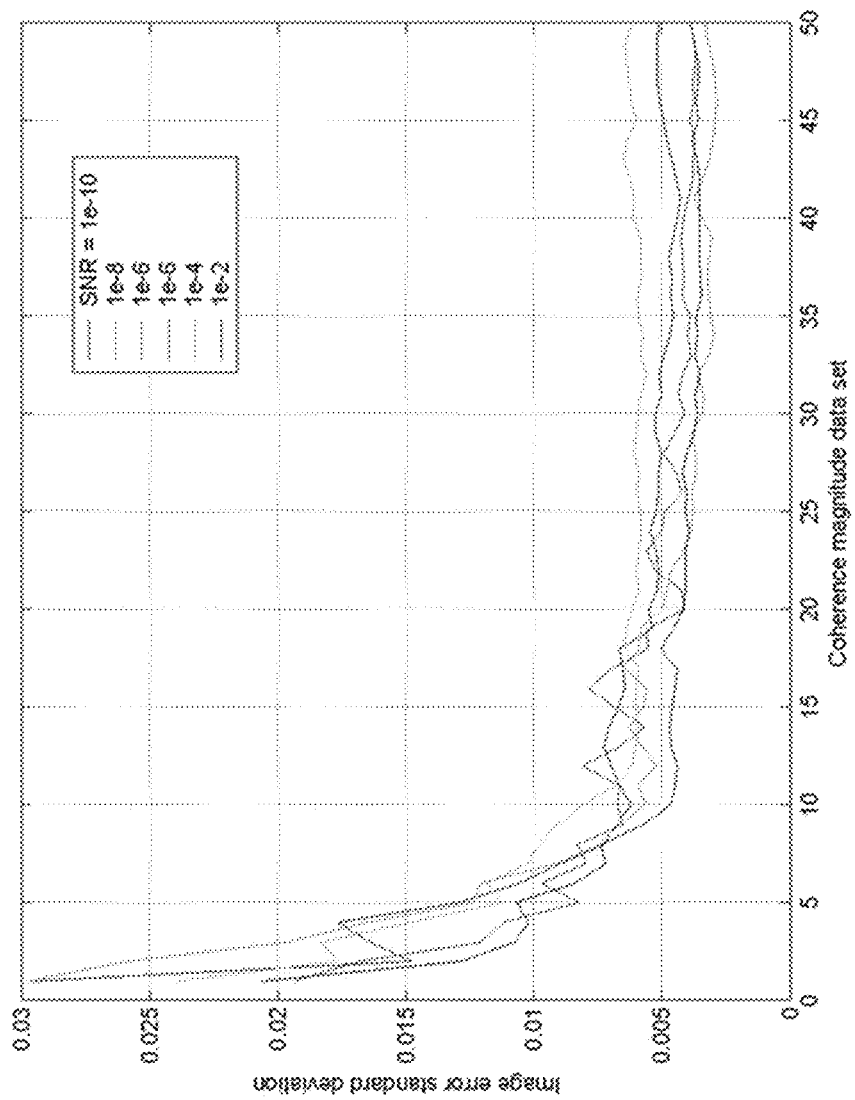
FIG. 12 shows the image error vs. L for various values of coherence magnitude SNR.

The above results pertain to the coherence magnitude squared signal-to-noise-ratio, $SNR_{\tilde{G}^2}$, equal to $10^{-8}$. Now we consider the effects of various values of $SNR_{\tilde{G}^2}$. FIG. 12 shows $E_g$ versus L for $SNR_{\tilde{G}^2}$ ranging from $10^{-2}$ to $10^{-10}$. Clearly the larger $SNR_{\tilde{G}^2}$, the smaller the initial error. For very small values, we notice a "bottoming out" or apparent lower bound to the image error for the larger values of L. This appears to be the result of the formidable extent of computation and resultant round-off error and numerical conditioning. Pending further numerical refinements, $SNR_{\tilde{G}^2}$ no smaller than $10^{-10}$ to $10^{-11}$ seems to be the limit to performance.

Implications for ICI Signal Processing

The fundamental data to be collected for ICI consists in recording the intensity fluctuations observed at each of a pair of apertures (separated by some position vector that is in proportion to the relative position in the Fourier, or "u-v", plane), using appropriate photodetectors. The two data streams are multiplied and time averaged. The basic discovery in [1] was that this (ensemble) averaged intensity fluctuation cross correlation is proportional to the square of the magnitude of the mutual coherence. Of course, the time average, not the ensemble average can be measured, so the basic data consists of the square of the modulus of the "true" coherence plus noise, as in the model for $\hat{G}=|\overline{G}+\tilde{G}|$ above. Thus the SNR of the time averaged intensity fluctuation cross correlation is identical to the SNR of $\hat{G}^2$. Retaining only the dominant terms, this takes the simple form:

$$SNR_{\hat{G}^2} = \frac{1}{2}\overline{\beta}\sqrt{v_d \Delta T}|\gamma|^2$$

$\overline{\beta}$=Average number of photodetections per sec, per Hz (for one aperture)
$v_d$=Photodetector frequency bandwidth
$\Delta T$=Averaging time period
$|\gamma|$=Normalized coherence magnitude=$|\overline{G}|/\|\overline{G}\|_\infty \in [0,1)$ Further, assuming the apertures are identical and circular, $\overline{\beta}$ is given by:

$$\overline{\beta} = \frac{\pi}{4}D^2 \eta \overline{n}$$

D=Aperture diameter
$\eta$=Detector quantum efficiency
$\overline{n}$=Photons per second, per Hz, per unit area (spectral irradiance)

Now, the conventional approach is to let the averaging time increase until $SNR_{\hat{G}^2}$ becomes sufficiently large that the time average well approximates the ensemble average, $|\overline{G}|^2$. Then the resulting time averaged data for sufficiently many points in the u-v plane is input to a phase retrieval algorithm and the image reconstructed. Let us explore how long this might take using relatively inexpensive hardware on a fairly dim object.

For the above purpose, we take a 14th magnitude G-class star. Using a black body model and assuming ~50% attenuation through the atmosphere, we estimate: $\overline{n} \cong 7.5 \times 10^{-11}$ Also, suppose 0.5m apertures and a modest detector efficiency of 20%. Then $\overline{\beta} \cong 3 \times 10^{-12}$. Further, assume an inexpensive detector with bandwidth of only 10 MHz. To obtain reasonable image detail one must be able to detect $|\gamma|$ of order 0.1, and a minimal required SNR is ~10. Evaluating $$\Delta T = \frac{1}{v_d}\left(\frac{2SNR_{\hat{G}^2}}{\overline{\beta}|\gamma|^2}\right)^2,$$

we obtain the necessary averaging time:
$\Delta T = 1.4 \times 10^{17}$ years.

Next, we consider the present algorithm, which views data collection and image reconstruction as a unified process. We take L time averages of the intensity fluctuation cross-correlations, each of duration $\Delta T_L$, over non-overlapping time intervals. We accept the noisy data and run the algorithm to completion for each data set. Then we average the images resulting from all L data sets to obtain the normalized image error illustrated in FIGS. 11 and 12. Consider: How long should $\Delta T_L$ be? How many data sets, L, are required for our 14th magnitude example?

To address the first question, we set $SNR_{\hat{G}^2}$ to the value of the SNR we are prepared to process for each data set. At this time as noted in FIG. 12, an SNR in the range $10^{-10}$ to $10^{-11}$ seems to result in the limiting performance. Using the same parameter values as above, and setting $SNR_{\hat{G}^2} = 6.4 \times 10^{-11}$, Equation implies that roughly: $\Delta T_L \sim 100$s.

FIG. 12 shows that the limits to accuracy are achieved after about 30 data sets, Therefore, Total integration time=$L\Delta T_L$=3000s. Note from FIG. 12 that the normalized average error is of order 0.005, implying a final image SNR that is well above 100.

While the principles of the invention have been described herein, it is to be understood by those skilled in the art that this description is made only by way of example and not as a limitation as to the scope of the invention. Further embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A system for formulating a high quality image of a distal astronomical element for display comprising:
   a plurality of light collecting devices, each said device further comprising:
      at least one aperture on a surface for admitting light and for measuring optical intensity at a distal location over time, a plurality of apertures determining absolute magnitude of the optical coherence of at least one pair of apertures; and
   a plurality of photon sensors, each said photon sensor configured to receive photons over time;
   each said light collecting device configured to determine the magnitude of optical intensity and to record said optical intensity over time, said intensity outputs from each pair of light collectors being multiplied together and time averaged,
   each said device configured to determine the fluctuation of light intensity at any point in time by subtracting the average light intensity of each said device from said optical coherence;
   storage means for storing collected output; and
   a processor for processing collected output, said processor including:
      an optical coherence determinator for determining optical coherence of the received photons;
      an image assessment module for formulating an initial image, including magnitude and phase, from at least one known a priori constraint on the image and said determined absolute magnitude; and
      a noise suppressor for reducing noise of the determined optical coherence by applying an iterative phase retrieval algorithm comprising the steps of:
         (a) applying said initial image comprising initial image magnitude and initial image phase;
         (b) manipulating said magnitude of said optical coherence to conform to said initial image magnitude resulting in an estimated magnitude;
         (c) obtaining an image function from said estimated magnitude and said initial image phase, where said image function includes representations of pixelated elements into a grid and the coherence magnitude comprises a nonnegative matrix of the same dimensions as said grid;
         (d) transforming said image function into an estimated image;

(e) applying imaging constraints to said estimated image to create an end image by modifying the initial coherence magnitude data to conform the estimate image to the image a priori constraint;
(f) determining an image differential between said initial image and said end image;
(g) evaluating whether said image differential has reached a predetermined no-change threshold; and
(h) reiterating steps (b)-(g) to attain the predetermined no-change threshold between said initial image and said end image;

said processor formulating a high quality image of said distal element for display by applying a second algorithm including a Fourier transform of said initial image to said end image by and to formulate said high quality image.

2. The system of claim 1 wherein at least one of said processor and said storage means includes means for sending said recorded output to all other apertures and at least one aperture is configured to determine the absolute magnitude of the optical coherence.

3. The system of claim 1 wherein said coherence determinator utilizes Intensity Correlation Imaging (ICI) to form an on-going series of images.

4. The system of claim 3 wherein said ICI involvement measures intensity fluctuations.

5. The system of claim 1 wherein said coherence determinator implements time averaged cross-correlation of the collected measured optical coherence.

6. The system of claim 1 wherein the input of the phase retrieval algorithm includes the absolute magnitude of the optical coherence.

7. The system of claim 1 wherein the number of coherence measurements equals the number of pixels in a desired optical image.

8. The system of claim 1 wherein the noise suppressor operates by manipulating the absolute magnitude of the optical coherence to conform the recorded output to an initial image a priori constraint.

9. The system of claim 1 wherein said light collecting devices, said photon sensors, said optical coherence determinator, and said processor; including said image assessment module and noise suppressor are photonic.

10. The system of claim 1 wherein said light collecting devices are located in outer space.

11. The system of claim 1 wherein said distal astronomical element is located on the surface of a planet.

12. A method for formulating a high quality image of a distal astronomical element for display, said image constructed using a plurality of light collecting devices, each said device including a plurality of apertures on a surface and a plurality of photo sensors, and a processor, said processor further comprising a noise suppressor, an optical coherence determinator, and an image assessment module, comprising the steps of:

with a plurality of light collecting devices and an optical intensity determinator, receiving photons, measuring optical intensity at a distal location over time, and recording intensity fluctuation output over time, said output at any point in time determined by subtracting the average light intensity from the optical intensity;

determining the absolute magnitude of the optical coherence by multiplying the intensity fluctuation of each pair of said devices;

with a noise suppressor, reducing the noise of the received data by applying an iterative phase retrieval algorithm comprising the steps of:
(a) assuming an initial image, said initial image formulated by an image assessment module from said determined absolute magnitude, said initial image comprising initial image magnitude and initial image phase;
(b) manipulating said magnitude of said optical coherence to conform to said initial image magnitude resulting in an estimated magnitude;
(c) obtaining an image function from said estimated magnitude and said initial image phase, where said image function includes representations of pixelated elements into a grid and the coherence magnitude comprises a nonnegative matrix of the same dimensions as said grid;
(d) transforming said image function into an estimated image;
(e) applying imaging constraints to said estimated image to create an end image by modifying the initial coherent magnitude to conform the estimated image to a prior image constraint;
(f) determining an image differential between said initial image and said end image;
(g) evaluating whether said image differential has reached a predetermined no-change threshold; and
(h) reiterating steps (b)-(g) to attain the predetermined no-change threshold between said initial image and said end image and said processor formulating said high quality image of said distal element by applying a second algorithm including a Fourier transform of said initial image to said end image by and to construct said high quality image.

13. The method of claim 12 wherein at least one of said processor and said storage means includes means for sending said recorded output to all other apertures and at least one aperture is configured to determine the absolute magnitude of the optical coherence.

14. The method of claim 12 wherein said coherence determinator utilizes Intensity Correlation Imaging (ICI) to form an on-going series of images.

15. The method of claim 14 wherein said ICI involvement includes measuring intensity fluctuations.

16. The method of claim 12 wherein said coherence determinator implements time averaged cross-correlation of the collected measured optical coherence.

17. The method of claim 12 wherein the input of the phase retrieval algorithm includes the absolute magnitude of the optical coherence.

18. The method of claim 12 wherein the number of coherence measurements equals the number of pixels in a desired optical image.

19. The method of claim 12 wherein the noise suppressor operates by manipulating the absolute magnitude of the optical coherence to conform the recorded output to an initial image phase.

* * * * *